US009740450B2

United States Patent
Kano (10) Patent No.: US 9,740,450 B2
(45) Date of Patent: Aug. 22, 2017

(54) IMAGE DISPLAY DEVICE, IMAGE DISPLAY SYSTEM, AND IMAGE DISPLAY METHOD

(75) Inventor: Nozomu Kano, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 73 days.

(21) Appl. No.: 14/413,931

(22) PCT Filed: Jul. 12, 2012

(86) PCT No.: PCT/JP2012/067820
§ 371 (c)(1),
(2), (4) Date: Jan. 9, 2015

(87) PCT Pub. No.: WO2014/010059
PCT Pub. Date: Jan. 16, 2014

(65) Prior Publication Data
US 2015/0138039 A1    May 21, 2015

(51) Int. Cl.
*G06F 3/14* (2006.01)

(52) U.S. Cl.
CPC ..... *G06F 3/1446* (2013.01); *G09G 2300/026* (2013.01); *G09G 2320/10* (2013.01);
(Continued)

(58) Field of Classification Search
None
See application file for complete search history.

(56) References Cited

U.S. PATENT DOCUMENTS 5,784,035 A * 7/1998 Hagiwara ............. G06F 3/1446
345/1.3
2002/0071247 A1* 6/2002 Clark .................... G06F 3/1446
361/679.21
(Continued)

FOREIGN PATENT DOCUMENTS

| CN | 101055708 A | 10/2007 |
|---|---|---|
| CN | 101286289 A | 10/2008 |

(Continued)

OTHER PUBLICATIONS

International Search Report in [PCT/JP2012/067820] dated [Sep. 25, 2012] (English Translation Thereof).
(Continued)

*Primary Examiner* — Vijay Shankar
*Assistant Examiner* — Kebede Teshome
(74) *Attorney, Agent, or Firm* — McGinn IP Law Group, PLLC (57) ABSTRACT

An image display device includes: a display unit that includes a plurality of display lines; a detection unit that detects presence of an input of a predetermined position information signal; a signal output control unit that instructs whether or not to output a position information signal in accordance with a detection result by the detection unit; a signal output unit that outputs the position information signal in a case of being instructed; a display direction switching control unit that instructs switching of a vertical display direction to the display unit in accordance with the detection result; an image data input unit that receives image data including data for each display line; and an image data transmission switching unit that switches a transmission order of the data for each display line in accordance with the detection result, and transmits to the display unit the image data.

7 Claims, 4 Drawing Sheets

(52) U.S. Cl.
   CPC ... *G09G 2360/122* (2013.01); *G09G 2370/18* (2013.01); *G09G 2370/22* (2013.01)

(56) References Cited

U.S. PATENT DOCUMENTS

| | | | | |
|---|---|---|---|---|
| 2008/0018554 A1* | 1/2008 | Odagawa | ............... | G06F 3/1446 345/5 |
| 2009/0073117 A1* | 3/2009 | Tsurumi | ................. | G06F 3/005 345/158 |
| 2009/0096711 A1* | 4/2009 | Jang | ..................... | G06F 3/1446 345/1.3 |

FOREIGN PATENT DOCUMENTS

| | | |
|---|---|---|
| CN | 101751882 A | 6/2010 |
| JP | 06-259048 A | 9/1994 |
| JP | 09-204164 A | 8/1997 |
| JP | 2003-044028 A | 2/2003 |
| JP | 2005-086592 A | 3/2005 |

OTHER PUBLICATIONS

Chinese Office Action (CN Application No. 201280074613.9) dated Mar. 13, 2017, with an English translation.

\* cited by examiner

IMAGE DISPLAY DEVICE, IMAGE DISPLAY SYSTEM, AND IMAGE DISPLAY METHOD

TECHNICAL FIELD

The present invention relates to an image display device, an image display system, and an image display method.

BACKGROUND ART

In recent years, there has been an increasing number of applications for displaying a single image on a large screen by multi-tiling, in which a plurality of image display devices such as liquid crystal display devices are combined (Patent Document 1). In such applications, there are not only still images, but also numerous cases of displaying moving images. When performing moving image display in this kind of multi-tiling, at the interface of the image display devices that are connected side by side in the vertical direction, there is the problem of misalignment occurring between the image display device on the upper side and the image display device on the lower side.

PRIOR ART DOCUMENTS

Patent Document

[Patent Document 1] Japanese Unexamined Patent Application, First Publication No. 2005-86592

SUMMARY OF THE INVENTION

Problem to be Solved by the Invention

Figure 6:
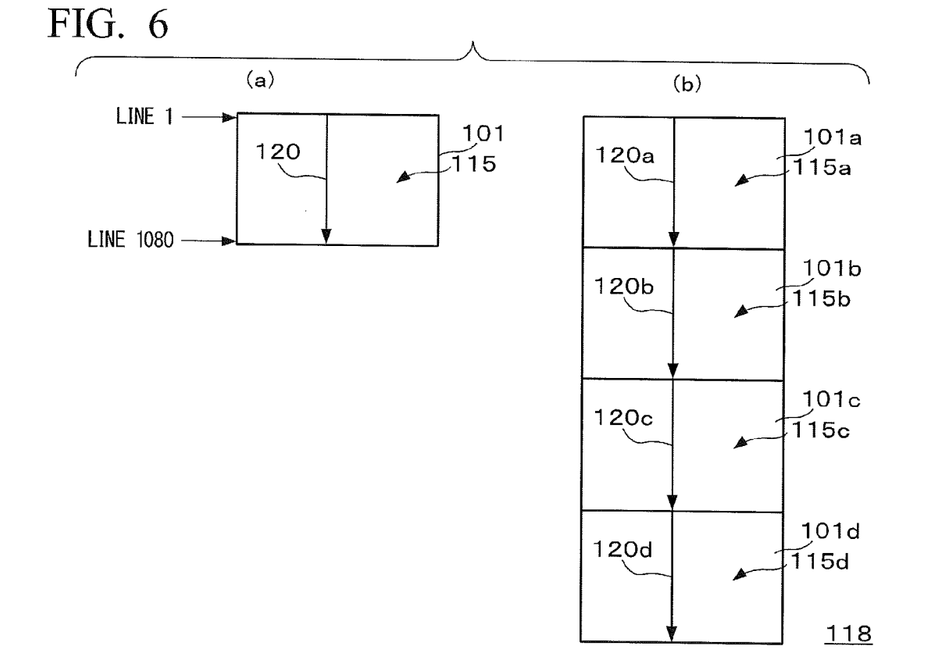
FIG. 6 is an explanatory view for describing the problem to be solved by the present invention.
Figure 7:
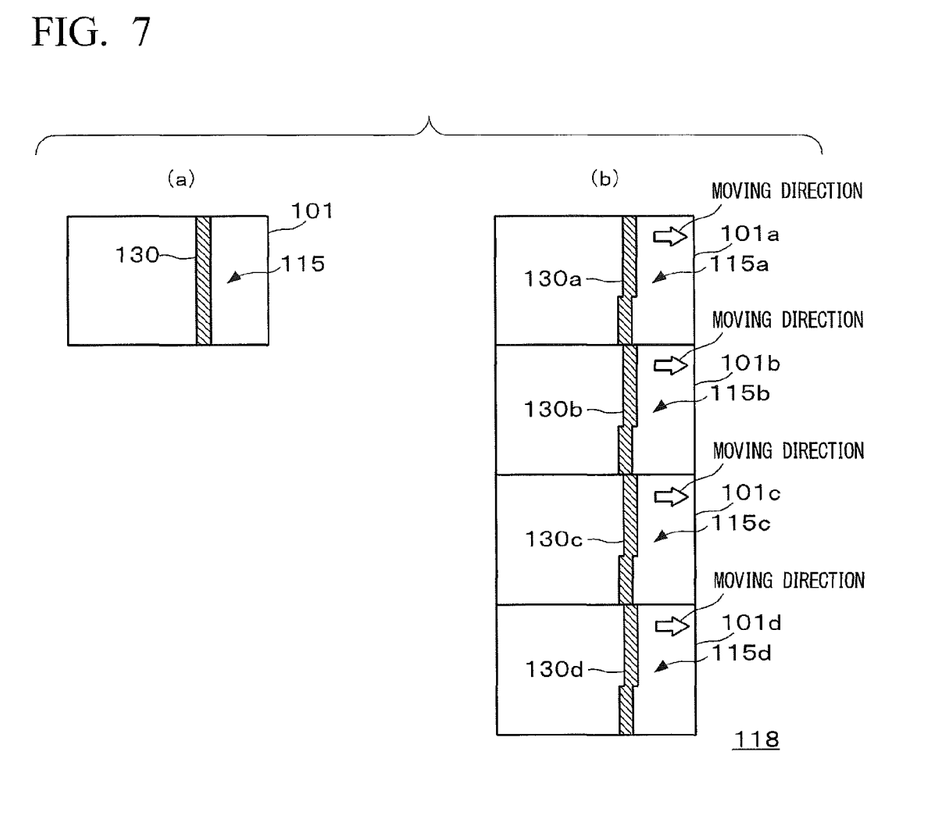
FIG. 7 is an explanatory view for describing the problem to be solved by the present invention.

Here, the aforementioned problem shall be described in detail referring to FIG. 6 and FIG. 7. FIG. 6 and FIG. 7 are drawings prepared by the applicants for describing the problems to be solved by the present invention. FIG. 6 (a) is a front view schematically showing a display unit 115 of an image display device 101. FIG. 6 (b) is a front view schematically showing a multi-tiling image display system 118 provided with four image display devices 101a, 101b, 101c, and 101d.

In the example shown in FIG. 6 (a), the display unit 115 of the image display device 101 has 1080 image lines from line 1 at the top edge to line 1080 at the bottom edge. Hereinbelow, the image lines shall be sometimes called lines. Also, each line is displayed in a display direction 120. That is, in the image display device 101 shown in FIG. 6 (a), the image data is displayed in sequence from top to bottom at a fixed cycle. In this case, data is displayed first at the topmost line of the image display device 101, and the data is displayed 1080th at the bottommost line. One frame of the image data of each line is retained until the next image data is displayed.

On the other hand, in the image display system 118 shown in FIG. 6 (b), four of the image display devices 101 shown in FIG. 6 (a) (shown as the image display devices 101a to 101d in FIG. 6 (b)) are arranged side by side in the vertical direction. In this case, in the image display system 118, the directions and orientations of the display direction 120a of the display unit 115a, the display direction 120b of the display unit 115b, the display direction 120c of the display unit 115c, and the display direction 120d of the display unit 115d are all the same.

Next, referring to FIG. 7, a display example of a moving image in the image display system 118 shown in FIG. 6 shall be described. FIG. 7 (a) is a front view that schematically shows an example of image data that is displayed in the display unit 115 of the image display device 101. FIG. 7 (b) is a front view that schematically shows the display state of a moving image in the image display system 118 in the case of causing a vertical line 130 shown in FIG. 7 (a) to move in the moving direction of the arrows.

As shown in FIG. 7 (b), when a moving image is displayed by stacking a plurality of the image display devices 101 vertically, in the case of the image display device 101 with 1080 lines from top to bottom, the data is displayed in 1080th place at the bottommost line of the upper side image display device 101 (for example, the image display device 101a), and one frame is retained. Meanwhile, the data is displayed in first place at the first line of the image display device on the lower side (for example, the image display device 101b) that is adjacent with the upper side image display device 101 (in this example, the image display device 101a). That is to say, the vertical lines 130a, 130b, 130c and 130d that are displayed in the display units 115a, 115b, 115c, and 115d, respectively, are displayed with the 1080th line being delayed a maximum of one frame behind the first line in the direction of progress from 130a to 130d. For that reason, misalignment occurs in the image at the interface between the image display device 101 (in this example, the image display device 101a) and the image display device 101 (in this example, the image display device 101b) arranged side by side in the vertical direction. That is, misalignment is produced in the image at the interface between the image display device 101a at the top and the second image display device 101b, between the second image display device 101b and the third image display device 101c, and between the third image display device 101c and the fourth image display device 101d.

The present invention has been achieved in view of the aforementioned circumstances, and has as its an exemplary object to provide an image display device, an image display system, and an image display method that can suppress and decrease to a misalignment of a moving image occurring at the interfaces of at least two image display devices arranged in a row.

Means for Solving the Problem

In order to solve the aforementioned problem, an image display device of one exemplary aspect of the present invention includes: a display unit that displays image data in a horizontal direction and a vertical direction; a detection unit that detects presence of an input of a predetermined position information signal output from another image display device; a signal output control unit that instructs whether or not to output a position information signal from the image display device itself in accordance with a detection result by the detection unit; a signal output unit that outputs the position information signal in a case of the signal output control unit instructing output of the position information signal; a display direction switching control unit that instructs switching of a vertical display direction to the display unit in accordance with the detection result by the detection unit; an image data input unit that receives the image data; and an image data transmission switching unit that switches a transmission order of each image line in accordance with the detection result by the detection unit, and transmits to the display unit the image data received by the image data input unit.

Also, an image display system of one exemplary aspect of the present invention includes a plurality of image display devices including: a display unit that displays image data in a horizontal direction and a vertical direction; a detection unit that detects presence of an input of a predetermined position information signal output from another image display device; a signal output control unit that instructs whether or not to output a position information signal from the image display device itself in accordance with a detection result by the detection unit; a signal output unit that outputs the position information signal in a case of the signal output control unit instructing output of the position information signal; a display direction switching control unit that instructs switching of a vertical display direction to the display unit in accordance with the detection result by the detection unit; an image data input unit that receives the image data; and an image data transmission switching unit that switches a transmission order of each image line in accordance with the detection result by the detection unit, and transmits to the display unit the image data received by the image data input unit, and the image display system is constituted by the plurality of image display devices being arranged side by side in a plurality in the vertical display direction.

Also, an image display method of one exemplary aspect of the present invention, by using: a display unit that displays image data in a horizontal direction and a vertical direction; a detection unit that detects presence of an input of a predetermined position information signal output from another image display device; a signal output unit that outputs a position information signal in a case of the signal output control unit instructing output of the position information signal; and an image data input unit that receives the image data; and includes the steps of: instructing whether or not to output a position information signal from the image display device itself in accordance with a detection result by the detection unit; instructing switching of a vertical display direction to the display unit in accordance with the detection result by the detection unit; and switching a transmission order of image lines in accordance with a detection result by the detection unit, and transmitting to the display unit image data received by the image data input unit.

Effect of the Invention

In the case of arranging the image display device of the present invention side by side in a plurality in for example the vertical direction, it is possible to set them to mutually different orientations such that the vertical display direction of the odd-numbered image display devices counting from the bottom is made top-to-bottom, and the vertical display direction of the even-numbered image display devices counting from the bottom is made bottom-to-top. In this case, it is possible to match the display order of display lines at the interface of the odd-numbered image display devices and the even-numbered image display devices. Thereby, it is possible to suppress and decrease to a misalignment of a moving image produced at the interfaces of at least two image display devices arranged in a row.

EMBODIMENTS FOR CARRYING OUT THE INVENTION

Figure 1:
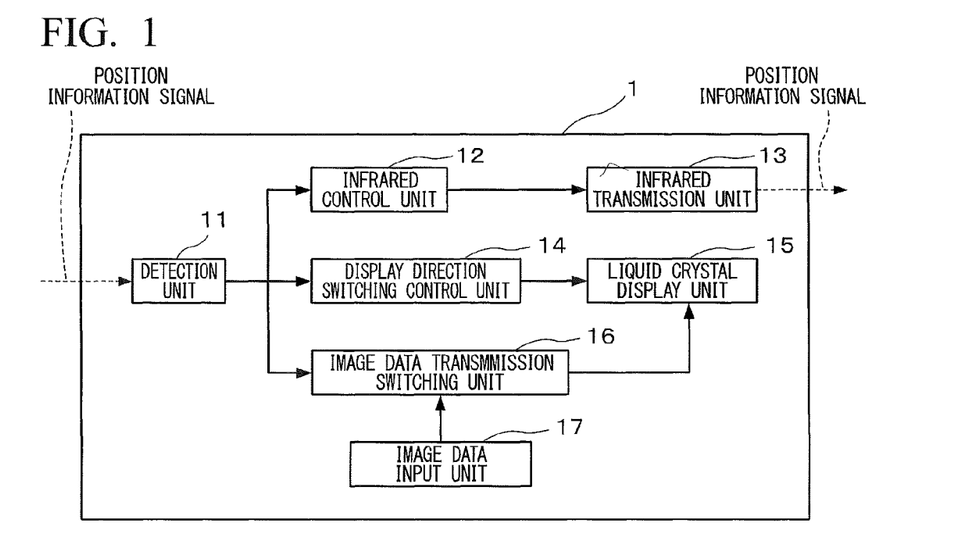
FIG. 1 is a block diagram that shows the constitution of one exemplary embodiment of an image display device according to the present invention.

Hereinbelow, one exemplary embodiment of an image display device according to the present invention shall be described with reference to the drawings. FIG. 1 is a block diagram that shows the constitution of the one exemplary embodiment of the image display device according to the present invention. The image display device 1 of the present exemplary embodiment is constituted as a liquid crystal display device. The image display device 1 includes a detection unit 11, an infrared control unit 12, an infrared transmission unit 13, a display method switching control unit 14, a liquid crystal display unit 15, an image data transmission switching unit 16, and an image data input unit 17. However, the image display device 1 of the present invention is not limited to the case of being constituted as a liquid crystal display device, and can be constituted as a display device that uses another display medium.

The detection unit 11 detects the presence of an input of a predetermined position information signal transmitted from the infrared transmission unit 13 of another image display device 1. Here, the predetermined position information signal is for example an optical radio signal such as an infrared modulation signal that represents predetermined data. The detection unit 11 can be constituted from a photoelectric conversion element that converts an incident infrared signal to an electrical signal, and a signal processing circuit for performing a process that determines, based on that output signal, whether or not the predetermined position information signal has been input. The detection unit 11 outputs a signal indicating as a detection result the presence of the input of a predetermined position information signal transmitted from the infrared transmission unit 13 of another image display device 1 to the infrared control unit 12, the display direction switching control unit 14, and the image data transmission switching unit 16.

Note that the predetermined position information signal is not limited to an infrared signal, and may be a visible light signal. Also, it may be a radio signal for short-range transmission. In addition, it is not limited to a radio signal, and may be a wired signal. Note that a constitution for the case of making it a wired signal shall be described below.

The infrared control unit 12 is a signal processing circuit that instructs whether or not to output the position information signal from the same image display device 1 itself (that is, the infrared transmission unit 13) in accordance with the detection result of the predetermined position information signal by the detection unit 11. The infrared control unit 12 for example outputs a control signal that instructs the infrared transmission unit 13 to stop a position information signal in the case of receiving a signal indicating the detection result of detection of the predetermined position information signal from the detection unit 11. Also, the infrared control unit 12 outputs a control signal that instructs the infrared transmission unit 13 to output the position information signal in the case of receiving a signal indicating the detection result of non-detection of the predetermined position information signal from the detection unit 11.

The infrared transmission unit 13 outputs the predetermined position information signal in the case of the infrared control unit 12 instructing output of the position information signal. Here, the predetermined position information signal is the same or equivalent infrared signal as the position information signal that the detection signal 11 detects, and for example, is an optical radio signal such as an infrared modulation signal that expresses predetermined data. The position control signal output from the infrared transmission unit 13 becomes a signal for the detection unit 11 of another image display device 1 to detect the presence of an input.

The display method switching control unit 14 is a signal processing circuit that instructs switching of the direction of the vertical display to the liquid crystal display unit 15 in accordance with the detection result by the detection unit 11. In the case of a signal indicating the detection result of detection of the predetermined position information signal being received from the detection unit 11, the display method switching control unit 14 outputs to the liquid crystal display unit 15 a signal instructing for example the display direction of an image to be made bottom-to-top. Also, in the case of a signal indicating the detection result of non-detection of the predetermined position information signal being received from the detection unit 11, the display method switching control unit 14 outputs to the liquid crystal display unit 15 a signal instructing for example the display direction of an image to be made top-to-bottom.

The liquid crystal display unit 15 is constituted from a liquid crystal panel and drive control circuitry thereof, and based on image data received from the image data transmission switching unit 16, displays an image based on the image data while displaying in a horizontal and vertical manner. Also, the liquid crystal display unit 15, based on a signal instructing switching of the direction of the vertical display input from the display method switching control unit 14, performs image display by switching the image display direction to either of bottom to top or top to bottom.

The image data transmission switching unit 16 is a signal processing circuit that, in accordance with the detection result of the predetermined position information signal by the detection unit 11, switches the transmission order of each line of image data input to the image data input unit 17 and transmits it to the liquid crystal display unit 15. In the case of a signal indicating the detection result of detection of the predetermined position information signal being received from the detection unit 11, the image data transmission switching unit 16 for example transmits the image data of each line to the liquid crystal display unit 15 in the order of bottom to top in the vertical direction. Also, in the case of a signal indicating the detection result of non-detection of the predetermined position information signal being received from the detection unit 11, the image data transmission switching unit 16 for example transmits the image data of each line to the liquid crystal display unit 15 in the order of top to bottom in the vertical direction.

The image data input unit 17 receives the image data to be displayed by the liquid crystal display unit 15, and outputs it to the image data transmission switching unit 16. The image data input unit 17 can receive image data from a predetermined storage device or a detachable storage medium not shown that is provided in the image display device 1. Also, the image data input unit 17 can receive image data via a transmission cable for image data that is connected to a predetermined input terminal or a predetermined communication network by using a predetermined communication unit not illustrated that is provided within the image display device 1. Also, in the case of inputting image data via a transmission cable or a predetermined communication network, it is possible to supply the image data from an external image data playback device or from another image display device 1.

Figure 2:
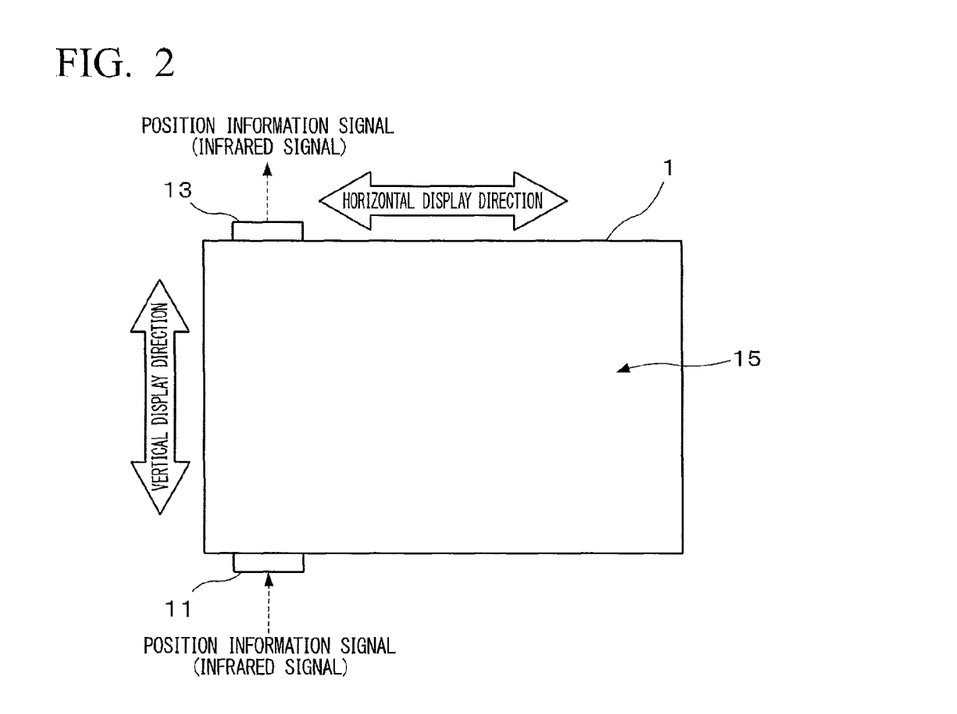
FIG. 2 is a front view that schematically shows an appearance constitution example of the image display device 1 shown in FIG. 1.
Figure 5:
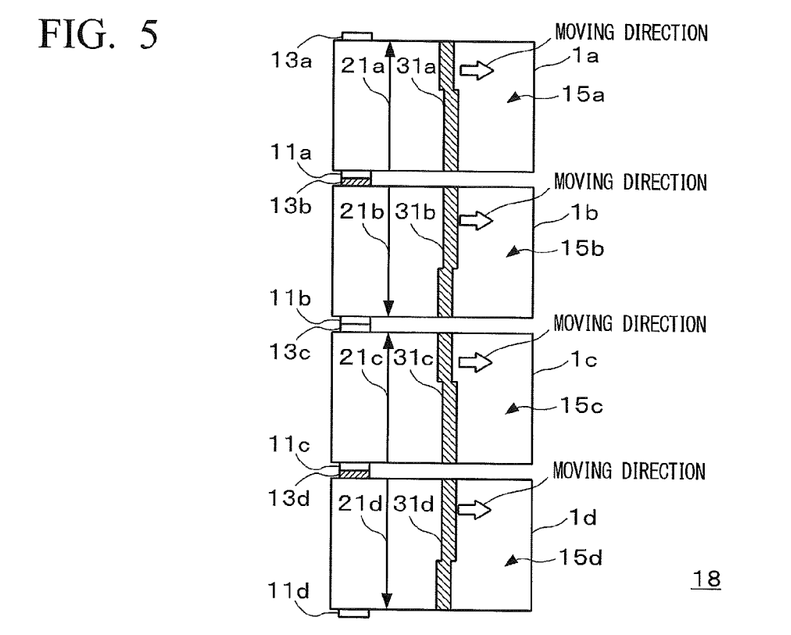
FIG. 5 is a front view for describing an operation example of the image display device 1 shown in FIG. 1.

Next, the appearance configuration of the image display device 1 shown in FIG. 1 shall be described referring to FIG. 2. In FIG. 2, the same reference symbols used in FIG. 1 are used for the same or corresponding constitutions. As shown in FIG. 2, the image display device 1 has a display surface of the liquid crystal display unit 15 at the front, and a portion (or all) of the detection unit 11 and the infrared transmission unit 13 are provided outside the housing of the image display device 1. At least the light receiving surface and the light emission surface of the detection unit 11 and the infrared transmission unit 13 are provided outside the housing. In this case, the light receiving surface or the light emission surface may be provided so as to have a projection on the outer portion of the housing. Alternatively, for example, by being provided in a cavity provided in the outer portion of the housing, or by being flush with the surface position, the light receiving surface and the light emission surface may need not have a projection such that protrudes from the outer periphery of the housing to the outside. In this case, the detection unit 11 detects the presence of the input of a position information signal (shown by the dotted arrow line) that is incident from one direction in the vertical direction of the liquid crystal display unit 15. Also, the infrared transmission unit 13 outputs the position information signal (shown by the dotted arrow line) from the other direction in the vertical direction of the liquid crystal display unit 15. Also, when the image display device 1 is installed side by side in the vertical display direction with another image display device 1 as shown in FIG. 5, the detection unit 11 and the infrared transmission unit 13 are arranged to face each other so that the infrared signal output from the detection unit 11 is received by the infrared transmission unit 13. Note that, as shown in FIG. 2, in the present exemplary embodiment, the left-right direction of the liquid crystal display unit 15 is the horizontal display direction, while the top-bottom direction is the vertical display direction.

Figure 3:
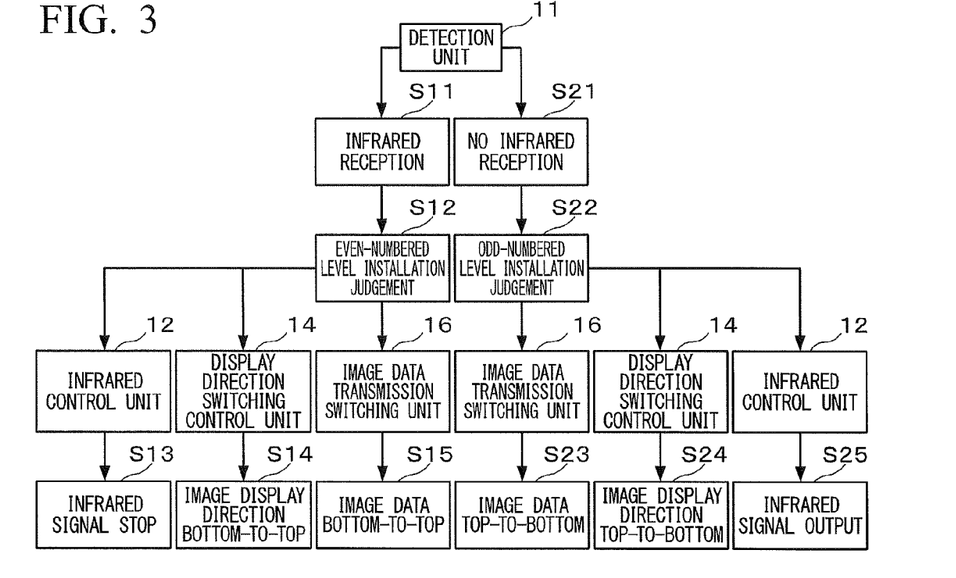
FIG. 3 is an explanatory view for describing the operation example of the image display device 1 shown in FIG. 1.
Figure 4:
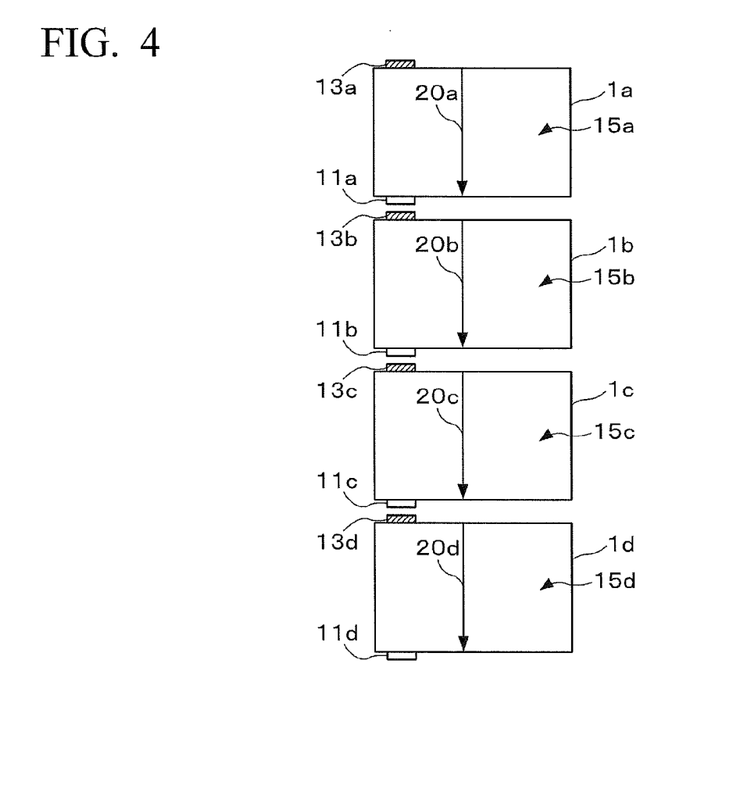
FIG. 4 is a front view for describing an operation example of the image display device 1 shown in FIG. 1.

Referring to FIG. 3, the signal processing flow in the image display device 1 shown in FIG. 1 shall be described. In FIG. 3, the same reference symbols used in FIG. 1 are used for the same or corresponding constitutions. In FIG. 3, the processes performed by the detection unit 11, the infrared control unit 12, the display method switching control unit 14, or the image data transmission switching unit 16 shall be indicated by reference symbols prefixed with the letter "S". Note that the image display device 1 can be used in a state of a plurality of image display devices 1 being arranged side by side in the vertical display direction as shown in FIG. 5, and can be used in the state of each image display device 1 operating independently as shown in FIG. 4.

As shown in FIG. 3, the reception state of the infrared signal, which is the position information signal, by the detection unit 11 is either infrared reception (S11) or no infrared reception (S21). In the case of the infrared signal reception state of reception (S11), the detection unit 17 judges the same image display device 1 itself to be arranged at an even-numbered level counting from the bottom, in the arrangement as shown in FIG. 5 (S12). In this case, the detection unit 11 outputs a signal indicating the detection result of detection of a position information signal to the infrared control unit 12, the display method switching control unit 14, and the image data transmission switching unit 16.

When a signal indicating the detection result of detection of a position information signal is input from the detection unit 11, the infrared control unit 12 stops the output of an infrared signal (S13). Also, when a signal indicating the detection result of detection of a position information signal is input from the detection unit 11, the display method switching control unit 14 outputs to the liquid crystal display unit 15 a predetermined signal that switches the image display direction to bottom-to-top (S14). Also, when a signal indicating the detection result of detection of a position information signal is input from the detection unit 11, the image data transmission switching unit 16 switches the transmission order of image data to bottom-to-top, and subsequently repeatedly performs output of image data to the liquid crystal display unit 15 in this order (S15).

On the other hand, in the case of the infrared signal reception state of no reception (S21), the detection unit 11 judges the image display device 1 itself to be arranged at an odd-numbered level counting from the bottom, in the arrangement as shown in FIG. 5 (S22). In this case, the detection unit 11 outputs a signal indicating the detection result of no detection of a position information signal to the infrared control unit 12, the display method switching control unit 14, and the image data transmission switching unit 16.

When a signal indicating the detection result of no detection of a position information signal is input from the detection unit 11, the image data transmission switching unit 16 switches the transmission order of image data to top-to-bottom, and subsequently repeatedly performs output of image data to the liquid crystal display unit 15 in this order (S23). Also, when a signal indicating the detection result of no detection of a position information signal is input from the detection unit 11, the display method switching control unit 14 outputs to the liquid crystal display unit 15 a predetermined signal that switches the image display direction to top-to-bottom (S24). Also, when a signal indicating the detection result of no detection of a position information signal is input from the detection unit 11, the infrared control unit 12 starts the output of an infrared signal (or continues it in the case of already being started) (S25).

Next, operation examples of the case of using a plurality of the image display device 1 shown in FIG. 1 shall be described, referring to FIG. 4 and FIG. 5. FIG. 4 shows the case of each image display device 1 being arranged at an interval exceeding the distance which the position information signal can reach. FIG. 5 shows the case of a plurality of the image display devices 1 being arranged side by side in the direction of vertical display of the liquid crystal display unit 15. In the installation example of FIG. 5, each image display device 1 is installed at in interval within the distance which the position information signal can reach. Note that in FIG. 4 and FIG. 5, by adding the Roman letters "a", "b", "c" and "d" to the end of the reference symbols used in FIG. 2, the same constitutions are shown. Here, the image display device 1a with the letter "a" added to the end is the image display device 1 that is arranged at the top among the four. Similarly, the image display devices 1b, 1c, and 1d are the image display devices 1 arranged second, third, and fourth from the top, respectively. Also, among the infrared transmission units 13a, 13b, 13c and 13d, those outputting an infrared signal are shown by the diagonal hatching.

As shown in FIG. 4, in the case of each of the image display devices 1a, 1b, 1c, and 1d being arranged at an interval exceeding the distance which the position information signal can reach, each of the detection units 11a, 11b, 11c and 11d do not detect a position information signal. That is, the detection units 11a, 11b, 11c and 11d perform the determination of there being no infrared reception (S21) and the process of odd-numbered level installation judgment (S22) in FIG. 3. Accordingly, each infrared control unit 12 instructs infrared signal output (S25), and the infrared transmission units 13a, 13b, 13c and 13d output an infrared signal (enter the hatched state). Also, as shown by the arrows 20a, 20b, 20c and 20d, the image data is controlled to be top-to-bottom by each image data transmission switching unit 12 (S23), and the image display direction is controlled to be top-to-bottom by each display direction switching control unit 14 (S24). In this case, when displaying a moving image that moves the vertical line 130 as described referring to FIG. 7 (a), the same display state results in each of the image display devices 1a, 1b, 1c and 1d in the same manner as shown in FIG. 7 (b). However, unlike the image display devices 101a, 101b, 101c and 101d of FIG. 7 (b), the image display devices 1a, 1b, 1c and 1d are installed separated by at least a certain distance.

On the other hand, in the case of each of the image display devices 1a, 1b, 1c and 1d being installed within a distance which the position information signal can reach as shown in FIG. 5, the infrared transmission unit 13d at the bottom and the infrared transmission unit 13b at second level higher than that output infrared signals (as shown by the hatched state), while the infrared transmission unit 13a at the top and the infrared transmission unit 13c on the third level do not output infrared signals (as shown by the non-hatched state).

That is, the infrared transmission unit 13d at the bottom has no infrared reception (S21), and therefore the image display device 1d is judged by the detection unit 11d to be installed at an odd-numbered level counting from the bottom (S22). Also, the infrared transmission unit 13d outputs an infrared signal (S25). In addition, as shown by the arrow 21d, the image data is controlled to be top-to-bottom by the image data transmission switching unit 16 (S23), and the image display direction is controlled to be top-to-bottom by the display direction switching control unit 14 (S24).

Next, the detection unit 11c of the image display device 1c that is second from the bottom detects the infrared signal that is output from the infrared transmission unit 13d (S11). In this case, the image display device 1c is judged by the detection unit 11c to be installed at an even-numbered level counting from the bottom (S12). Also, the infrared transmission unit 13c stops the infrared signal (S13). In addition, as shown by the arrow 21c, the image display direction is controlled to be bottom-to-top by the display direction switching control unit 14 (S14), and the image data is controlled to be bottom-to-top by the image data transmission switching unit 16 (S15).

Next, the infrared transmission unit 13b that is third from the bottom has no infrared reception (S21), and therefore the image display device 1b is judged by the detection unit 11b to be installed at an odd-numbered level counting from the bottom (S22). Also, the infrared transmission unit 13b outputs an infrared signal (S25). In addition, as shown by the arrow 21b, the image data is controlled to be top-to-bottom by the image data transmission switching unit 16 (S23), and the image display direction is controlled to be top-to-bottom by the display direction switching control unit 14 (S24).

Then, the detection unit 11a of the image display device 1a that is fourth from the bottom detects the infrared signal that is output from the infrared transmission unit 13b (S11). In this case, the image display device 1a is judged by the detection unit 11a to be installed at an even-numbered level counting from the bottom (S12). Also, the infrared transmission unit 13a stops the infrared signal (S13). In addition, as shown by the arrow 21a, the image display direction is controlled to be bottom-to-top by the display direction switching control unit 14 (S14), and the image data is controlled to be bottom-to-top by the image data transmission switching unit 16 (S15).

In the aforementioned case, the interface between the image display device 1a and the image display device 1b and the interface between the image display device 1c and the image display device 1d become the display line for the first line in the image display device 1a, the image display device 1b, the image display device 1c, and the image display device 1d. On the other hand, the interface between the image display device 1b and the image display device 1c becomes the display line for the 1080th line. Thereby, the display timing is synchronized since image display is performed at the same time at the display lines at the upper side of the image display devices 1d and 1b, which are on odd-numbered levels from the bottom, and at the display lines at the lower side of the image display devices 1c and 1a, which are arranged on the upper side to be adjacent thereto and are on even-numbered levels from the bottom. Similarly, since the display lines at the upper side of the even-numbered levels from the bottom and the display lines of the odd-numbered levels from the bottom that are arranged to be adjacent thereto are displayed at the end of one frame, synchronization of the display timing is similarly obtained. Thereby, even when displaying a moving image in multi-tiling of two levels or more, it becomes possible to perform display with no misalignment of the image. For that reason, when moving the vertical line 130 shown in FIG. 7 (a) in the moving direction of the arrows, the vertical lines 31a, 31b, 31c, and 31d displayed in the respective display units 15a, 15b, 15c, and 15d of the image display devices 1a, 1b, 1c, and 1d become images that move through nearly the same position in the horizontal direction at each interface. That is, it is possible to eliminate misalignment at each interface of the image display devices 1a, 1b, 1c, and 1d.

In the above manner, the display direction of image data is top-to-bottom at the first level from the bottom, bottom-to-top at the second level from the bottom, top-to-bottom at the third level from the bottom, and bottom-to-top at the fourth level from the bottom. Thereby, since image data is displayed at the same timing at the interface of each image display device 1, there is no misalignment even when displaying moving images. By doing so, by providing a function to change the display direction of image data, and an infrared transmission unit and detection unit for position detection of the even-numbered levels and odd-numbered levels in the image display device 1 of the present exemplary embodiment, even when displaying a moving image in a multi-tiling application that is installed across a plurality of levels, it is possible to display images with no moving image misalignment occurring at the interfaces of the image display devices 1.

In the aforementioned exemplary embodiment, detection of the position is performed by providing the infrared transmission unit 13 and the detection unit 11 for detection of the position of the image display device 1, but it is also possible to determine the position information in the same manner by having a position information output terminal and an input terminal and connecting them with a cable, instead of the infrared transmission unit 13 and the detection unit 11 for radio signals. In this case, the position information output terminal and the input terminal are respectively associated with either one or the other of the vertical display directions of the liquid crystal display unit 15. That is to say, the presence of a predetermined wired signal that is input from a predetermined input terminal associated with one vertical display direction of the liquid crystal display unit 15 is detected as the presence of an input of the aforementioned position information signal. Also, the signal output unit of the wired signal corresponding to the infrared transmission unit 13 serves to output the aforementioned position information signal by outputting a predetermined wired signal from a predetermined signal information output terminal that is associated with the other vertical display direction of the liquid crystal display unit 15.

Also, the effect is the same even in the case of continuously installing side by side horizontally the image display device 1 stacked over a plurality of levels in the aforementioned exemplary embodiment. That is, there is no change in the effect of reducing misalignment at each interface between image display devices 1 arranged vertically.

Also, a program for realizing all or some of the functions of each unit in FIG. 1 may be recorded on a computer-readable recording medium, and by reading the program that is recorded on this recording medium into a computer system and running it, each process may be performed. Note that a "computer system" here includes an operating system and hardware such as peripheral devices.

Also, the "computer system" in the case of using a WWW system also include a homepage providing environment (or display environment).

Furthermore, the "computer-readable recording medium" refers to a portable medium such as a flexible disk, a magneto-optical disk, ROM, CD-ROM and the like, or a storage device such as a hard disk that is housed in a computer system. Moreover the "computer-readable recording medium" also includes a recording medium that retains a program for a given period of time, such as a volatile memory in a computer system that functions as a server or client. The abovementioned program may be one for realizing some of the functions described above, and moreover may be one capable of realizing the abovementioned functions in combination with a program that has already been stored in the computer system. Further, the program described above may be stored in a predetermined server, and may be distributed (downloaded and the like) via communication lines in accordance with a request from another device.

While the exemplary embodiment of this invention has been described above in detail with reference to the drawings, a concrete configuration is not limited to this exemplary embodiment, and designs or the like in a range not departing from the scope of the present invention are also included.

While the exemplary embodiment of the present invention has been described above in detail with reference to the drawings, a concrete configuration is not limited to this exemplary embodiment, and designs or the like in a range not departing from the scope of the present invention are also included.

[Supplementary Note 1]

An image display device including: a display unit that displays image data in a horizontal direction and a vertical direction; a detection unit that detects presence of an input of a predetermined position information signal output from another image display device; a signal output control unit that instructs whether or not to output a position information signal from the image display device itself in accordance with a detection result by the detection unit; a signal output unit that outputs the position information signal in a case of the signal output control unit instructing output of the position information signal; a display direction switching control unit that instructs switching of a vertical display direction to the display unit in accordance with the detection result by the detection unit; an image data input unit that receives the image data; and an image data transmission switching unit that switches a transmission order of each image line in accordance with the detection result by the detection unit, and transmits to the display unit the image data received by the image data input unit.

[Supplementary Note 2]

The image display device according to supplementary note 2, wherein the position information signal is an optical radio signal, the detection unit detects presence of a predetermined optical radio signal that is incident from one direction of the vertical direction of the display unit as the presence of the input of the position information signal, and the signal output unit emits a predetermined optical radio signal from other direction in the vertical direction of the display unit to thereby output the position information signal.

[Supplementary Note 3]

The image display device according to supplementary note 1, wherein the position information signal is a wired signal, the detection unit detects presence of a predetermined wired signal as the presence of the input of the position information signal, the predetermined wired signal being input from a predetermined input terminal that is associated with one direction of the vertical direction of the display unit, and the signal output unit outputs a predetermined wired signal from a predetermined output terminal that is associated with other direction in the vertical direction of the display unit, to thereby output the position information signal.

[Supplementary Note 4]

An image display system including a plurality of image display devices including: a display unit that displays image data in a horizontal direction and a vertical direction; a detection unit that detects presence of an input of a predetermined position information signal output from another image display device; a signal output control unit that instructs whether or not to output a position information signal from the image display device itself in accordance with a detection result by the detection unit; a signal output unit that outputs the position information signal in a case of the signal output control unit instructing output of the position information signal; a display direction switching control unit that instructs switching of a vertical display direction to the display unit in accordance with the detection result by the detection unit; an image data input unit that receives the image data; and an image data transmission switching unit that switches a transmission order of each image line in accordance with the detection result by the detection unit, and transmits to the display unit the image data received by the image data input unit, wherein the image display system is constituted by the plurality of image display devices being arranged side by side in a plurality in the vertical display direction.

[Supplementary Note 5]

An image display method by using: a display unit that displays image data in a horizontal direction and a vertical direction; a detection unit that detects presence of an input of a predetermined position information signal output from another image display device; a signal output unit that outputs a position information signal in a case of the signal output control unit instructing output of the position information signal; and an image data input unit that receives the image data; and including the steps of: instructing whether or not to output a position information signal from the image display device itself in accordance with a detection result by the detection unit; instructing switching of a vertical display direction to the display unit in accordance with the detection result by the detection unit; and switching a transmission order of image lines in accordance with a detection result by the detection unit, and transmitting to the display unit image data received by the image data input unit.

REFERENCE SYMBOLS 1, 1a, 1b, 1d Image display device (image display device)
11, 11a, 11b, 11c, 11d Detection unit (detection unit)
12 Infrared control unit (signal output control unit)
13, 13a, 13b, 13c, 13d Infrared transmission unit (signal output unit)
14 Display direction switching control unit (display direction switching control unit)
15, 15a, 15b, 15c, 15d Liquid crystal display unit (display unit)
16 Image data transmission switching unit (image data transmission switching unit)
17 Image data input unit (image data input unit)

The invention claimed is:

1. An image display device comprising:
a display unit that includes a plurality of display lines;
a detection circuit that detects a predetermined position information signal output from another image display device;
an image data input unit that receives image data including data for each display line; and
an image data transmission switching circuit that switches a transmission order of the data for each display line in accordance with a detection result by the detection circuit, and transmits to the display unit the image data including the data for each display line whose transmission order is switched,
wherein the display unit displays the transmitted image data,
wherein the detection circuit judges whether the image display device is installed at an odd-numbered level or at an even-numbered level by detecting presence of an input of the predetermined position information signal,
the image display device further comprises:
a signal output control circuit that instructs whether or not to output a position information signal from the image display device itself in accordance with whether the image display device is installed at the odd-numbered level or at the even-numbered level; and
a signal output unit that outputs the position information signal in a case of the signal output control circuit instructing output of the position information signal; and
a display direction switching control circuit that instructs switching of a vertical display direction to the display unit in accordance with whether the image display device is installed at the odd-numbered level or at the even-numbered level, and
wherein the image data transmission switching circuit switches the transmission order in accordance with whether the image display device is installed at the odd-numbered level or at the even-numbered level.

2. The image display device according to claim 1,
wherein the position information signal is an optical radio signal, and
the detection circuit detects a predetermined optical radio signal that is incident from a first direction along a vertical display direction as the position information signal.

3. The image display device according to claim 1,
wherein the position information signal is a wired signal, and
the detection circuit detects a predetermined wired signal as the position information signal, the predetermined wired signal being input from a predetermined input terminal that is associated with a first direction along a vertical display direction.

4. An image display system comprising a plurality of image display devices, each of the image display devices comprising:
a display unit that includes a plurality of display lines;
a detection circuit that detects a predetermined position information signal output from another image display device;
an image data input unit that receives image data including data for each display line; and
an image data transmission switching circuit that switches a transmission order of the data for each display line in accordance with a detection result by the detection circuit, and transmits to the display unit the image data including the data for each display line whose transmission order is switched,
wherein the display unit displays the transmitted image data, and
the plurality of image display devices are arranged side by side in a vertical display direction,
wherein the detection circuit judges whether the image display device is installed at an odd-numbered level or at an even-numbered level by detecting presence of an input of the predetermined position information signal,
each of the image display devices further comprises:
a signal output control circuit that instructs whether or not to output a position information signal from the image display device itself in accordance with whether the image display device is installed at the odd-numbered level or at the even-numbered level; and
a signal output unit that outputs the position information signal in a case of the signal output control circuit instructing output of the position information signal; and
a display direction switching control circuit that instructs switching of a vertical display direction to the display unit in accordance with whether the image display device is installed at the odd-numbered level or at the even-numbered level, and
wherein the image data transmission switching circuit switches the transmission order in accordance with whether the image display device is installed at the odd-numbered level or at the even-numbered level.

5. An image display method for an image display device including a display unit that includes a plurality of display lines, the image display method comprising:
detecting a predetermined position information signal output from another image display device;
receiving image data including data for each display line;
switching a transmission order of the data for each display line image lines in accordance with a detection result of detecting the position information signal;
transmitting to the display unit the image data including the data for each display line whose transmission order is switched;
displaying the transmitted image data by the display unit;
judging whether the image display device is installed at an odd-numbered level or at an even-numbered level by detecting presence of an input of the predetermined position information signal;
instructing whether or not to output a position information signal from the image display device itself in accordance with whether the image display device is installed at the odd-numbered level or at the even-numbered level;
outputting the position information signal in a case of output of the position information being instructed; and
instructing switching of a vertical display direction to the display unit in accordance with whether the image display device is installed at the odd-numbered level or at the even-numbered level,
wherein the switching the transmission order includes switching the transmission order in accordance with whether the image display device is installed at the odd-numbered level or at the even-numbered level.

6. The image display device according to claim 1, wherein the detection circuit judges that the image display device is installed at an odd-numbered level counted from a bottom when the detection circuit has detected the predetermined position information signal, and
the detection circuit judges that the image display device is installed at an even-numbered level counted from the bottom when the detection circuit has not detected the predetermined position information signal.

7. The image display device according to claim 1, wherein the position information signal detected by the detection circuit comprises an optical signal representing predetermined data, and
wherein the detection circuit comprises:
a photoelectric conversion element that converts the optical signal to an electrical signal; and
a signal processing circuit for determining based on the electrical signal, whether the predetermined position information signal has been input to the image display device.

* * * * *